United States Patent Office 3,447,690
Patented June 3, 1969

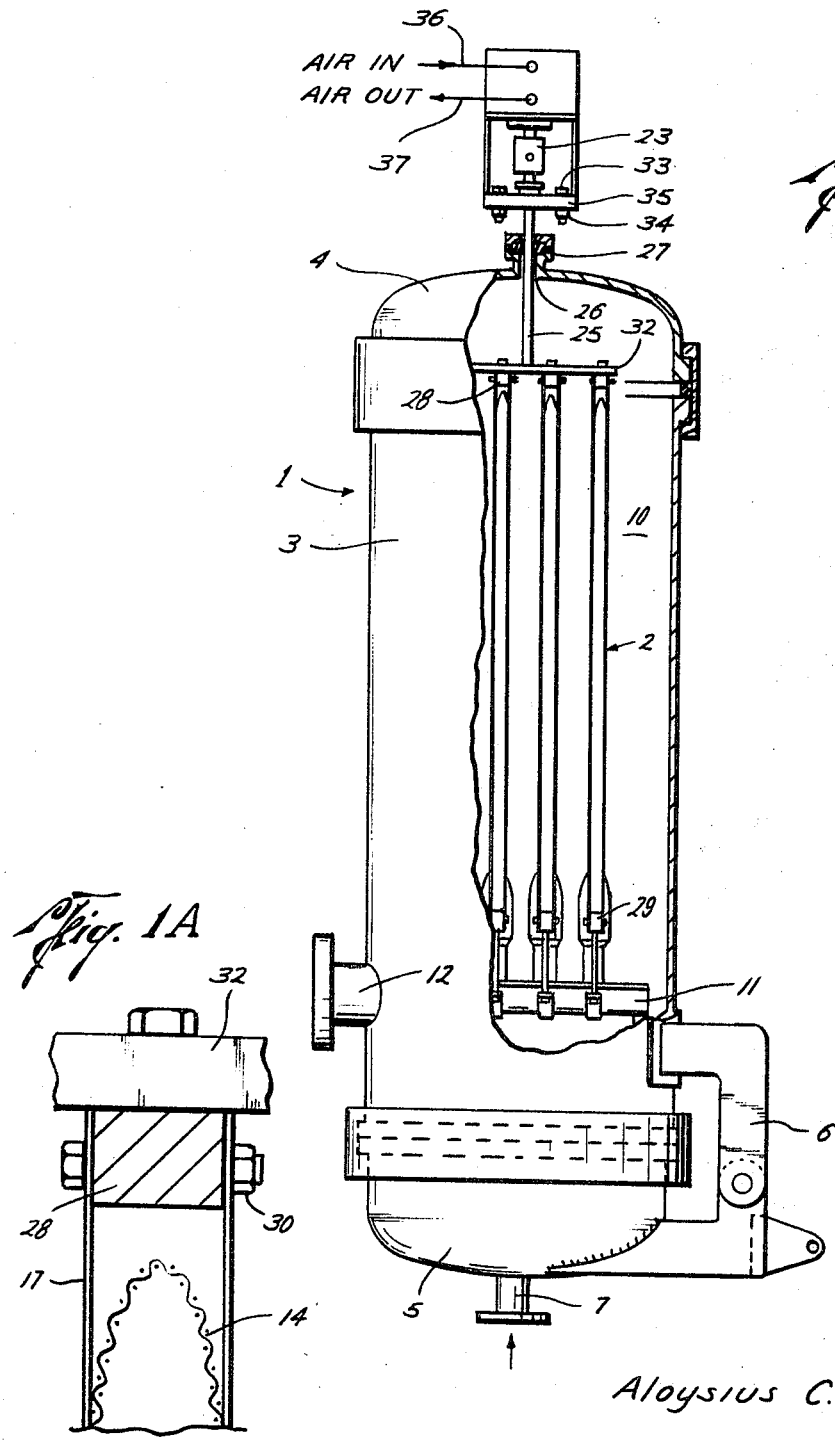

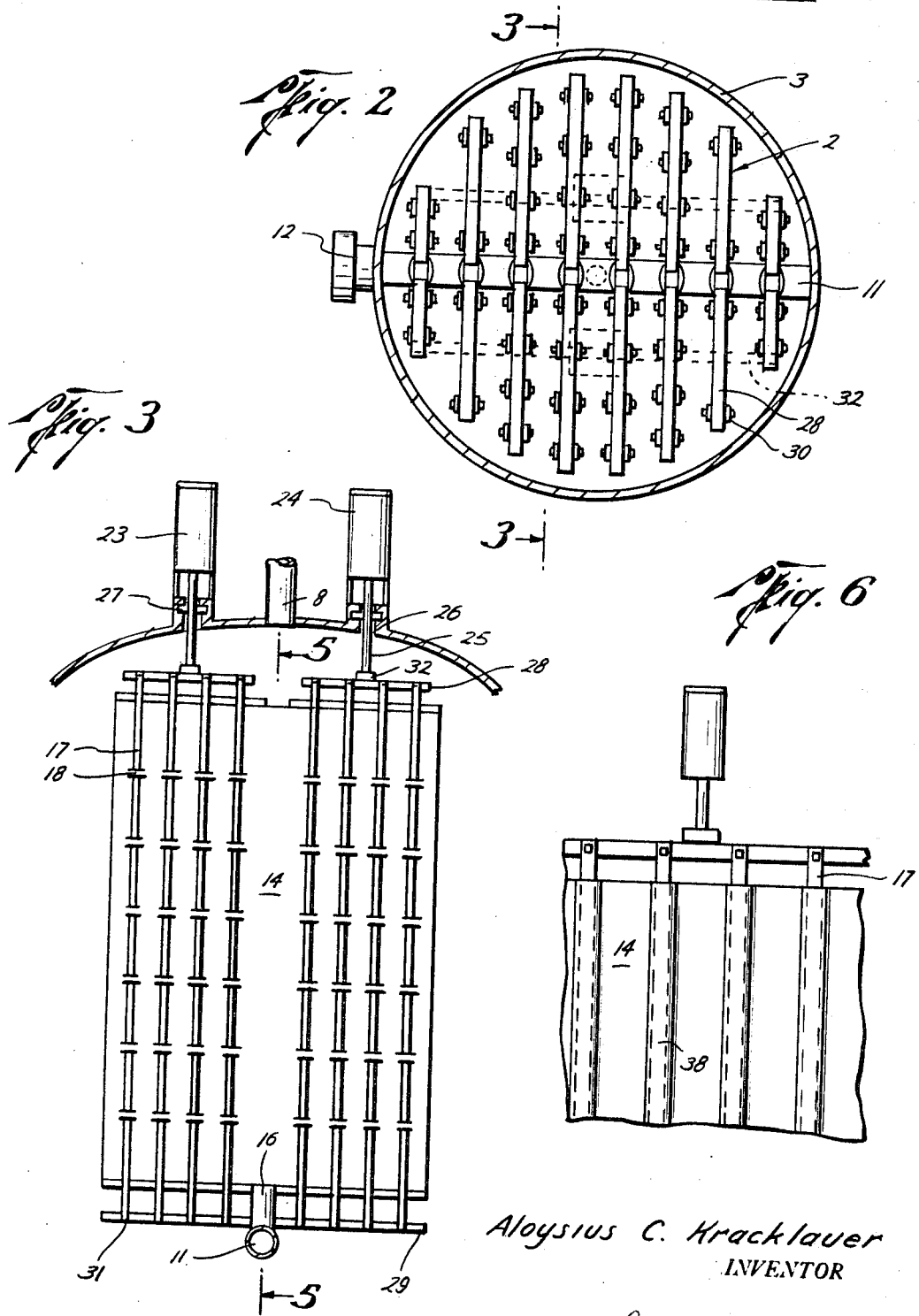

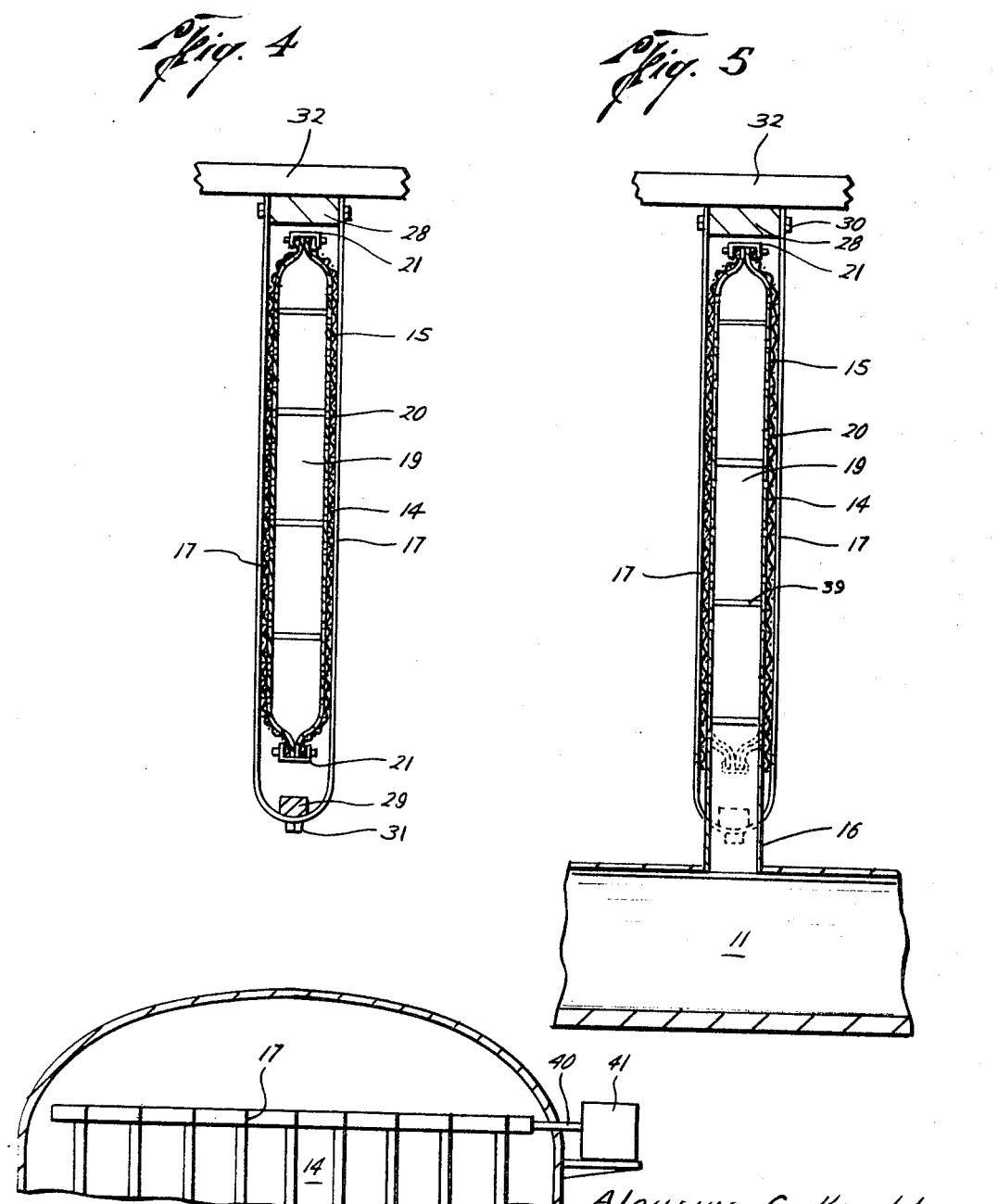

3,447,690
APPARATUS FOR REMOVAL OF FILTER CAKE
Aloysius C. Kracklauer, Conroe, Tex., assignor to Sparkler Manufacturing Company, Conroe, Tex., a corporation of Illinois
Filed May 25, 1966, Ser. No. 552,734
Int. Cl. B01d 25/34, 29/28, 35/16
U.S. Cl. 210—332     8 Claims

ABSTRACT OF THE DISCLOSURE

In a filter apparatus, a flexible filter bag is provided with loops, and a plurality of flexible strips extend through the loops. Flexing means are provided to selectively flex the strips. Flexing of the strips results in shaking of the bag and dislodging of the filter cake thereon.

---

This invention relates to an apparatus for removal of filter cake from flexible filtering means. More particularly, it relates to the removal of a filter cake in the dry or semi-dry condition from such elements.

In accordance with the invention, there is associated with a flexible filtering means apparatus for imparting a suitable motion to the flexible filtering means to shake a dry or semi-dry filter cake therefrom. Such apparatus conveniently takes the form of flexible metal or plastic strips as will be more fully explained below. Further means are included for actuating such flexible strips, and in accordance with the invention of a plurality of such actuating means may be included, and various of said actuating means may be independently operated. The invention lends itself to many various arrangements of the actuating means, filtering means, and the flexible strips. Units constructed and operated in accordance with the invention have been found to give surprisingly good results when compared with the apparatus and methods of the prior art.

Several of the many possible embodiments of the invention are illustrated in the accompanying drawings which form a part of this specification and wherein:

FIGURE 1 is a side elevational view of apparatus constructed in accordance with one embodiment of the invention, part of the apparatus being cut away to illustrate a plurality of filter leaves therein.

FIGURE 1A is a fragmentary view of the upper portion of one of the filter leaves of the FIGURE 1 apparatus.

FIGURE 2 is a plan view from the top of the interior of the apparatus illustrated in FIGURE 1.

FIGURE 3 is a front view of one of the filter leaves on the FIGURE 1 apparatus, as taken along the line 3—3 of FIGURE 2.

FIGURE 4 is a side view of the filter leaf shown in FIGURE 3.

FIGURE 5 is a view similar to FIGURE 4 but showing that portion of the filter leaf connected to the outlet manifold.

FIGURE 6 is a fractional view similar to FIGURE 3, illustrating another embodiment of the invention.

FIGURE 7 is a fractional view similar to FIGURE 3, illustrating still another embodiment of the invention.

Referring now to FIGURE 1, filtering apparatus constructed in accordance with this invention is disposed in a filter tank 1 which is comprised of a generally cylindrical housing 3, and operatively associated with housing 3, a top cover 4 and a bottom cover 5. The tank 1 defines a filtering chamber 10 in which a physical separation of certain solid materials from a fluid stream may be effected.

Top cover 4 is securely connected around its entire circumference with the housing 3 and suitable sealing means are included therebetween to prevent the flow of fluid from the chamber 10. Bottom cover 5 is conveniently pivotally connected to the housing 3 as by means of the hinge 6 and is also adapted for engagement with housing 3 around its entire circumference; suitable sealing means are also included to prevent fluid flow from the chamber 10 at this point.

Inlet means, such as the pipe 7 are included in the bottom cover 5, preferably centrally disposed therein. Such inlet may be useful not only in introducing fluid into the filtering chamber 10 but also in draining a slurry from the tank after progression of the filtration process to the desired extent. A vent 8 is desirably provided in the top cover portion 4, that vent also being conveniently centrally disposed. Through this vent, gases may if desired be removed from the filtering chamber 10, through convenient valve means.

Mounted in the filtering chamber 10 are a plurality of filter elements such as the elongate filter leaves 2. In the illustrated embodiment, the leaves 2 are seen to be generally vertically disposed in spaced, parallel relationship one with another. The interior of each of the leaves 2 communicates with an outlet manifold 11 which exits the tank 1 through an appropriately-shaped and sealed connection 12.

Covering each of the filter leaves 2 is a filtering means such as a flexible bag 14 (FIGURES 3–6). It will be understood that as fluid to be filtered flows through a filter bag 14 to the interior of its associated filter leaf 2, certain solid materials in the fluid will be deposited on the bag. The extent of this deposition will be determined by factors such as the nature of the fluid, the nature of the solid material or materials, the nature, weave, and thickness of the bag, and the relative pressures in the chamber 10 inside and outside the leaves 2. By careful selection of the various variables, many fluids may be effectively filtered in this manner.

The solid materials forming on the surface of each of the bags 14 comprise a filter cake. The filtering process is allowed to continue until all the fluid has been filtered, or until the process is no longer efficient either because the cake is so large that additional materials will not adhere to it or because the bags 14 are so clogged with cake that there is insufficient pressure drop, and hence little filtering action.

Removal of this filter cake from the filter bags has been a problem that has never been efficiently and effectively solved before the present invention. Numerous efforts have been made to solve this problem, as indicated for example by the United States Patents to Cannon et al. 2,874,848; Schmidt, 2,901,115 and 3,212,643; and Anderson, 2,902,160.

The Cannon et al. invention utilizes a generally horizontal bar which is mounted above a plurality of filter leaves, the bar having notches in the underside thereof to mate with and receive the filter leaves. Mounted on the bar is a vibrator which imparts a reciprocating action to the bar—the bar in turn shaking the filter leaves to remove the filter cake therefrom.

Anderson is quite similar in that it, too, illustrates a notched bar which mates with each of the filter leaves in a tank. The bar is vibrated and, in turn, shakes each of the filter leaves to dislodge filter cake.

Schmidt '115 attempts to dislodge this filter cake by imparting an up-and-down motion to the filter bags. This is done by suspending each of the bags from a shaker bar (which is actuated by a reciprocating device) and securing, to the inside surface of each bag, and elastic strip at the lower end of the bag. In this manner, the bags are moved up and down (see FIGURE 7A through 7C of Schmidt '115) to dislodge the cake.

Schmidt '643 vibrates a plurality of filter leaves by striking them with a bar which is activated by a reciprocating device.

The present invention provides means for effectively dislodging the filter cake which forms on the filter bags 14, without necessitating movement of the filter leaves. Such means conveniently take the form of the embodiment illustrated in FIGURES 1–5, where each of the filter leaves is formed of a couple of parallel spaced-apart metal plates 15 disposed vertically in the filtering chamber 10.

Each of the plates 15 includes a number of holes or perforations 20, through which perforations fluid is free to enter into the interior of the filter leaves from the chamber 10. Each plate 15 is pinched inwardly toward its mating plate along the periphery thereof and in this manner each pair of plates is sealed together to define an interior chamber 19 in each filter leaf, into which fluid may enter only through the perforations 20.

The interior chamber 19 of each filter leaf is in fluid communication with the outlet manifold 11, as by means of the centrally disposed outlet portion 16 (see FIGURE 5) of each such leaf.

Suitable sealing means such as the protective channels 21 are included around the periphery of the leaves, to prevent fluid leakage from the chamber 19 at the juncture of the plates which form the filter leaf.

A flexible porous bag 14 is mounted around each filter leaf, the bags being attached to the leaves in any suitable manner. For example, the bags may be sealed to the leaves at top and bottom along the junction of the plates 15, as illustrated in FIGURE 4. Such bags may be made of any suitable material, for example a woven fabric. The exact texture, weave, and thickness of each bag will depend to some degree on the filtering job the unit must perform. In size, it is desirable that the bags 14 be slightly larger that their corresponding filter leaves, so that the bags will fit loosely on the leaves.

In engagement with the bags 14 at the outer surface of the bags are means for imparting to the bags sufficient motion to effectively remove filter cake therefrom. Such means conveniently take the form of a plurality of flexible strips 17 which may engage the bags 14 in any suitable manner, such as the loop means illustrated in the FIGURES 1–5 embodiment. Here the bags 14 are constructed with a plurality of vertically aligned rings 18 for receipt of each strip 17.

The strips 17 are desirably constructed of metal, such as aluminum, or stainless steel, in which case they may be for example 1/32 or 1/16 inch in thickness, or of a suitable synthetic polymeric material such as polyethylene terephthalate, in which case they may be about 3/16 inch in thickness. For best results, it has been found that the strips should be placed at intervals of about 8 to 12 inches across each of the bags 14.

In accordance with the invention, actuating means are included for selectively imparting a flexing motion to the strips 17 to cause the strips to shake the bags 14 and thereby dislodge the filter cake from the bags. Such means conveniently take the form of air cylinders, such as those illustrated at 23 and 24. Such air cylinders or other actuating means may be operatively joined to the strips 17 in any suitable manner, but the manner ilustrated in the embodiment of FIGURES 1–5 has been found desirable. In this embodiment, where the cylinders are mounted on platforms above the top cover 4, a rod 25 extends from each such cylinder vertically into the top of filtering chamber 10, the rod entering the tank 1 through a hole 26 in the cover 4. At the point where the rod 25 enters the tank 1, a packing gland 27 is included to ensure against leakage of fluid from the filtering chamber 10 to the exterior of tank 1.

Conveniently mounted above each filter leaf 2 is a horizontally disposed bar 28, the bar extending generally parallel to the top surface of the elongate filter leaf. A pair of similar bars 29 is disposed beneath each filter leaf, the bars 29 also being horizontally disposed in the normal operating position, and extending generally parallel to the lower surface of the associated elongate filter leaf. The bars 29 are conveniently secured, as by welding, to the outlet portion 16 of each filter leaf, and each such bar 29 may in actual practice be comprised of two separate bars—one on each side of the outlet portion 16. It is seen that in this embodiment the bars 28 and 29 are parallel, one above and one below each of the filter leaves 2.

The flexible strips 17 are mounted on these bars 28 and 29, from which position that portion of the strips between the bars is free for flexing and is engaged by suitable loop means with the associated bag 14. While any suitable means may be employed to secure the strips 17 to the bars 28 and 29, the bolts 30 and 31 may be used for that purpose. It is recognized that a strip 17 may be constructed so as to extend from top bar 28 to bottom bar 29 and terminate there, or to extend from top bar 28, loop around bottom bar 29, and back to the other side of top bar 28. If the latter construction is used, the bolt 31 at the bottom bar 29 may not be necessary.

Means are included for joining the vertically-extending rods 25 with the horizontally-extending bars 28. If it is desired to have a separate actuating means for each filter leaf, the rod 25 may be joined directly, as by welding, to the bar 28. But economic considerations will generally dictate that one actuating means serve more than one filter leaf. In such event, an additional horizontally-extending transverse bar 32 may be associated with two or more filter leaves, each bar 32 being perpendicular to the bars 28 and joined, as by welding, to any suitable number of such bars. This arrangement is clearly illustrated in FIGURE 2.

In this manner, vertical reciprocating movement of the rods 25, caused by reciprocation of the cylinders 23, 24 or other suitable actuating means causes the bars 28 to move up and down to thereby flex the strips 17. Flexing of the strips 17 violently shakes the bags 14 to dislodge the filter cake from these bags.

As is quite apparent any suitable number of filter leaves, strips, bars, or cylinders may be employed. It is often very important, however, for best results in certain contexts of use, that independent actuating means be provided. Such a provision is made in one embodiment of this invention by independently actuated cylinders 23 and 24. At times a system wherein certain complete filter leaves are actuated by one cylinder, and other complete filter leaves are actuated by another cylinder, might be desirable. At other times, a system such as that illustrated in the FIGURES 1–5 embodiment, is desirable. In this embodiment, part of a bag is actuated by one cylinder and another part of the same bag is actuated by another cylinder. This system has been found to produce exceptionally good results in dislodging the filter cake from the bags. For some uses, it may be desired to synchronize the cylinders 23 and 24, or merely to provide only a single cylinder. For other uses, it may be desired to provide a plurality of cylinders, for example four.

The cylinders 23, 24 may be mounted as illustrated in FIGURES 1–5, or in any other suitable manner. In the FIGURES 1–5 embodiment they are seen to be secured by means of bolts 33 and nuts 34 on mounting platforms 35. Suitable air inlet line 36 and air exhaust line 37 are provided to each of the cylinders the operation of such cylinders being readily understood by those skilled in the art.

The FIGURE 6 embodiment is illustrative of another of the suitable loop means which may be employed to maintain the flexible strips 17 in flexible engagement with the bags 14. Here instead of the rings 18 which were employed in the FIGURES 1–5 embodiment each bag 14 contains a plurality of longitudinally extending casings 38 each casing adapted to receive a flexible strip 17. This arrangement provides for more firm holding of the strips 17 but is more expensive and in some contexts does not allow as much flexing as the FIGURES 1-5 arrangement.

The embodiment illustrated in FIGURE 7 illustrates other actuating means. In this embodiment a cam shaft 40 which is turned by a motor 41, is employed to flex the strips 17 of one or more bags 14.

In operation, the filtering chamber 10 is filled with the fluid to be filtered, as by introduction of the fluid by pumping through the inlet pipe 7, with the top cover 4 and the bottom cover 5 closed. At this time the vent 8 will be open.

When the filtering chamber 10 is full of the slurry to be filtered, flow of fluid into the tank is terminated, and a positive pressure is created in any suitable manner between the filter chamber 10 and the outlet manifold 11, thus causing a pressure drop across the filter leaves 2. This pressure drop causes the fluid to be filtered to move into the interior chambers 19 of the leaves 2, passing on its way through the flexible bags 14 which surround the filter leaves, depositing on these bags a filter cake. From the chambers 19, the filtrate passes into outlet manifold 11 which may be connected to any desired point for the collection of filtrate.

When the filtering operation has progressed to the desired degree of completion, the excess slurry is removed as by drain 7, and the bottom cover 5 is hingedly removed from engagement with the housing 3. The filter cake which has been deposited on the bags 14 may, if desired, be allowed or caused to dry.

The air cylinders 23 and 24 are then actuated, causing the rods 25 to reciprocate in an up-and-down motion, thereby effecting similar motion in the bars 32 and 28. This causes the flexible strips 17 to flex vigorously, rapidly and effectively shaking the filter cake from the bags 14. The dislodged filter cake falls by gravity through the opening left by removal of the bottom cover 5 from the housing 3, and may be recovered in any suitable manner if desired.

The apparatus is then ready for further filtration.

It is seen that the invention provides an effective, convenient, and efficient solution to a long standing problem in the filtration art.

While the invention has been described in terms of particularly advantageous embodiments, it will be understood by those skilled in the art that various structural changes may be made in these embodiments without departing from the scope of the invention, which is defined by the appended claims.

I claim:
1. Apparatus suitable for filtering fluids comprising:
   a filter housing defining a chamber in which filtration occurs;
   inlet means for introducing a fluid to be filtered into said chamber;
   at least one filter element disposed in said chamber;
   flexible filtering means surrounding said filter element, said filtering means being suitable for causing a filter cake to form thereon as said fluid passes therethrough;
   loops on said filtering means;
   flexible strips fitting through said loops, said strips being operable upon flexing to shake said filtering means to dislodge filter cake therefrom;
   actuating means for selectively flexing said flexible strips; and,
   outlet means in fluid communication with said filter element for removing a filtrate from said filtering chamber.

2. Apparatus according to claim 1, wherein said flexible filtering means is a cloth bag.

3. Apparatus according to claim 1, wherein said flexible strips are thin strips of metal.

4. Apparatus according to claim 1, wherein said flexible strips are thin strips of synthetic polymeric material.

5. Apparatus according to claim 1, wherein at least two actuating means are employed, at least one of which is independent of the others.

6. Apparatus according to claim 1, wherein said actuating means are air cylinders.

7. Apparatus for removing filter cake from a filter bag comprising:
   loops on said filter bag for receiving flexible strips,
   thin flexible strips fitting through said loops, said strips being operable upon flexing to shake said filter bag, and
   actuating means for selectively flexing said strips, whereupon said bag is shaked to dislodge filter cake therefrom.

8. Apparatus according to claim 7, wherein at least two actuating means are employed, at least one of which is independent of the others.

References Cited

UNITED STATES PATENTS

| | | | |
|---|---|---|---|
| 2,705,221 | 3/1955 | Clark et al. | 210—346 X |
| 3,212,643 | 10/1965 | Schmidt et al. | 210—332 |
| 3,310,175 | 3/1967 | McLagan | 210—332 X |
| 3,321,892 | 5/1967 | Saint-Jacques | 55—300 X |

SAMIH N. ZAHARNA, *Primary Examiner.*

U.S. Cl. X.R.

55—299, 300; 210—388